US011498257B2

(12) United States Patent
Volpato et al.

(10) Patent No.: US 11,498,257 B2
(45) Date of Patent: Nov. 15, 2022

(54) FRAME DEVICE AND METHOD FOR THERMOFORMING OBJECTS

(71) Applicant: CANNON ERGOS S.P.A., Milan (IT)

(72) Inventors: Marco Volpato, Milan (IT); Loredano Sbrana, Milan (IT)

(73) Assignee: CANNON ERGOS S.P.A.

( * ) Notice: Subject to any disclaimer, the term of this patent is extended or adjusted under 35 U.S.C. 154(b) by 116 days.

(21) Appl. No.: 16/807,263

(22) Filed: Mar. 3, 2020

(65) Prior Publication Data

US 2020/0282628 A1  Sep. 10, 2020

(30) Foreign Application Priority Data

Mar. 6, 2019  (IT) .......................... 102019000003271

(51) Int. Cl.
| | |
|---|---|
| *B29C 51/26* | (2006.01) |
| *B29C 51/14* | (2006.01) |
| *B29C 51/20* | (2006.01) |
| *B29C 51/10* | (2006.01) |

(52) U.S. Cl.
CPC ............ *B29C 51/262* (2013.01); *B29C 51/14* (2013.01); *B29C 51/20* (2013.01); *B29C 51/10* (2013.01)

(58) Field of Classification Search
CPC ...... B29C 51/262; B29C 51/20; B29C 70/541
See application file for complete search history.

(56) References Cited

U.S. PATENT DOCUMENTS

| | | | | | |
|---|---|---|---|---|---|
| 3,964,856 | A | * | 6/1976 | Day .................... | B29C 49/0691 |
| | | | | | 65/106 |
| 4,157,884 | A | * | 6/1979 | Andrae ................... | B29C 51/36 |
| | | | | | 425/173 |
| 5,972,151 | A | * | 10/1999 | Sbrana .................. | B29C 51/262 |
| | | | | | 156/286 |

(Continued)

FOREIGN PATENT DOCUMENTS

| | | |
|---|---|---|
| EP | 0393767 A2 | 10/1990 |
| EP | 0393767 A3 | 10/1990 |

(Continued)

*Primary Examiner* — Seyed Masoud Malekzadeh
(74) *Attorney, Agent, or Firm* — Laubscher & Laubscher PC

(57) ABSTRACT

A frame device for retaining and positioning sheet materials and possible reinforcing materials intended to be thermoformed to obtain objects made of composite material
includes a first tubular element defining internally a first vacuum chamber for grasping by aspiration a first sheet material
and a second tubular element defining internally a second vacuum chamber, separate from, and independent of the first vacuum chamber and configured for grasping by aspiration a second sheet material.
The first tubular element and the second tubular element are fixed together permanently so as to define a grasping framestructure configured as a single piece.
A third vacuum chamber is defined in the grasping frame structure, separate and independent of the first and second vacuum chambers and configured for removing air from the zone that is interposed between the first and second sheet materials and which is intended for being possibly occupied by the reinforcing materials.

8 Claims, 11 Drawing Sheets

(56) References Cited

U.S. PATENT DOCUMENTS

| | | | | |
|---|---|---|---|---|
| 8,926,310 | B2 * | 1/2015 | Irwin | B29C 51/082 |
| | | | | 425/398 |
| 9,102,093 | B2 * | 8/2015 | Sumi | B29C 51/105 |
| 9,738,028 | B2 * | 8/2017 | Rayama | B29C 51/262 |
| 2002/0150748 | A1 | 10/2002 | Delusky et al. | |

FOREIGN PATENT DOCUMENTS

| | | |
|---|---|---|
| GB | 1440935 | 6/1976 |
| WO | 9964221 A1 | 12/1999 |
| WO | 2007128397 A1 | 11/2007 |
| WO | 2019038509 A1 | 2/2019 |
| WO | 2019038509 A4 | 2/2019 |

\* cited by examiner

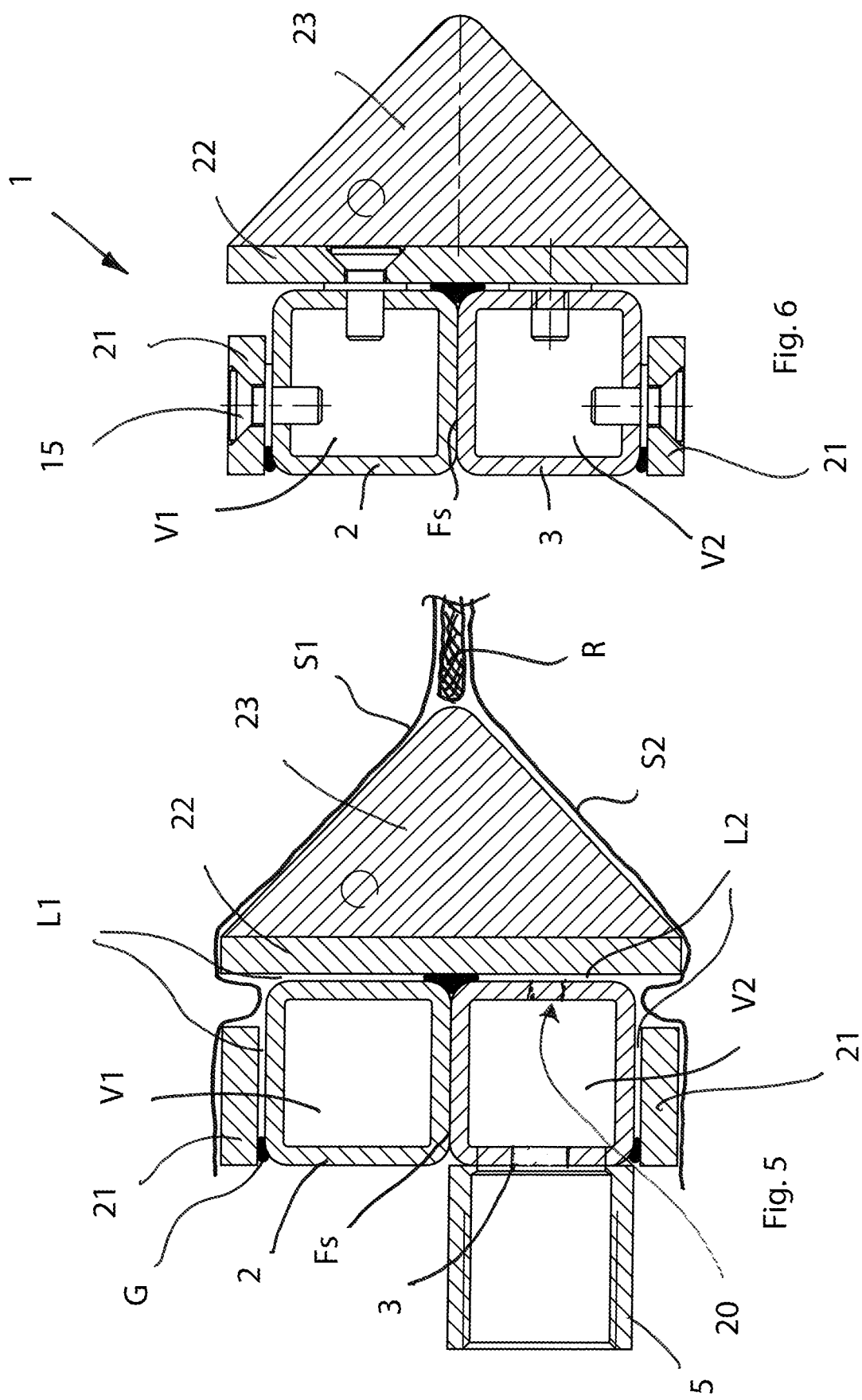

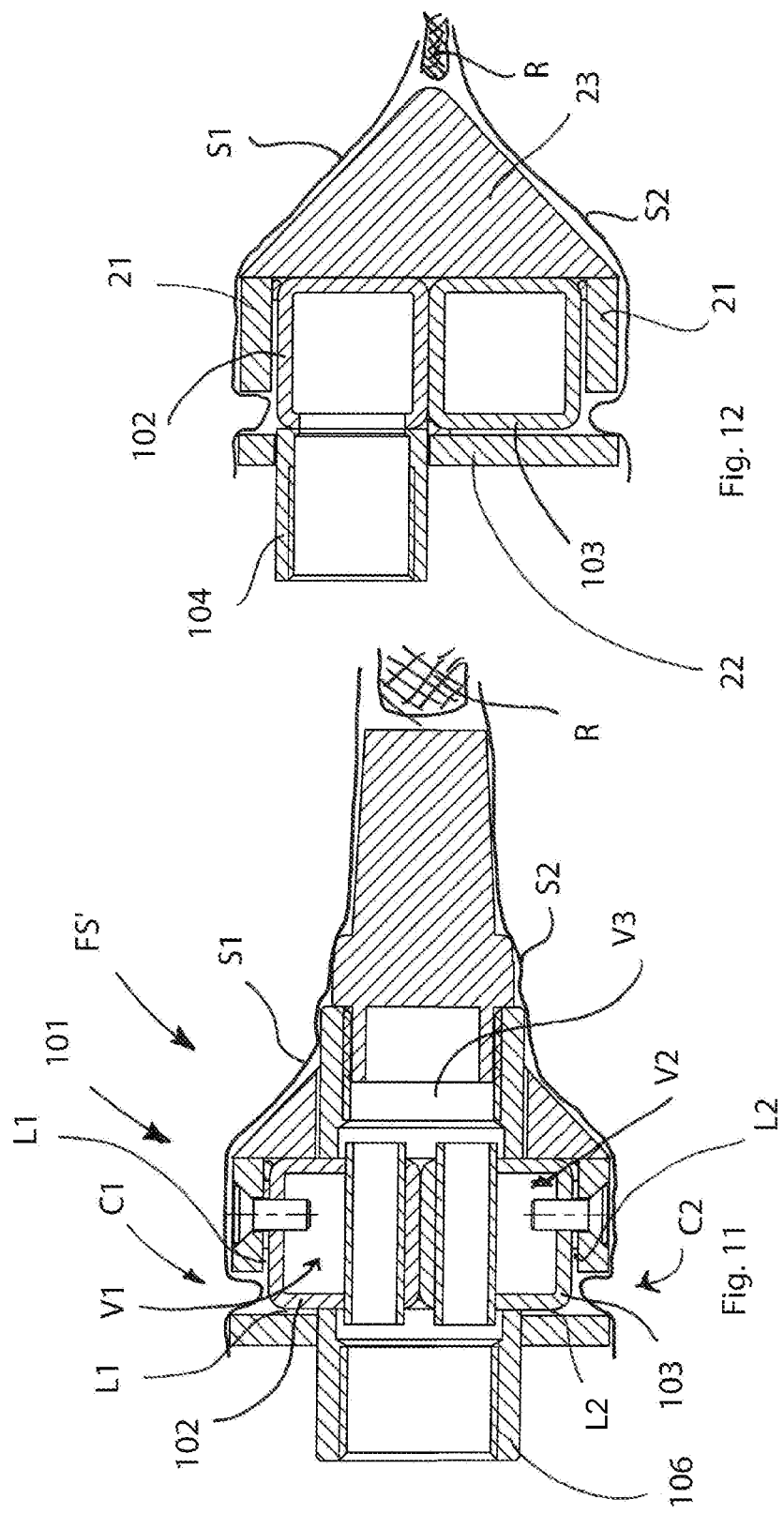

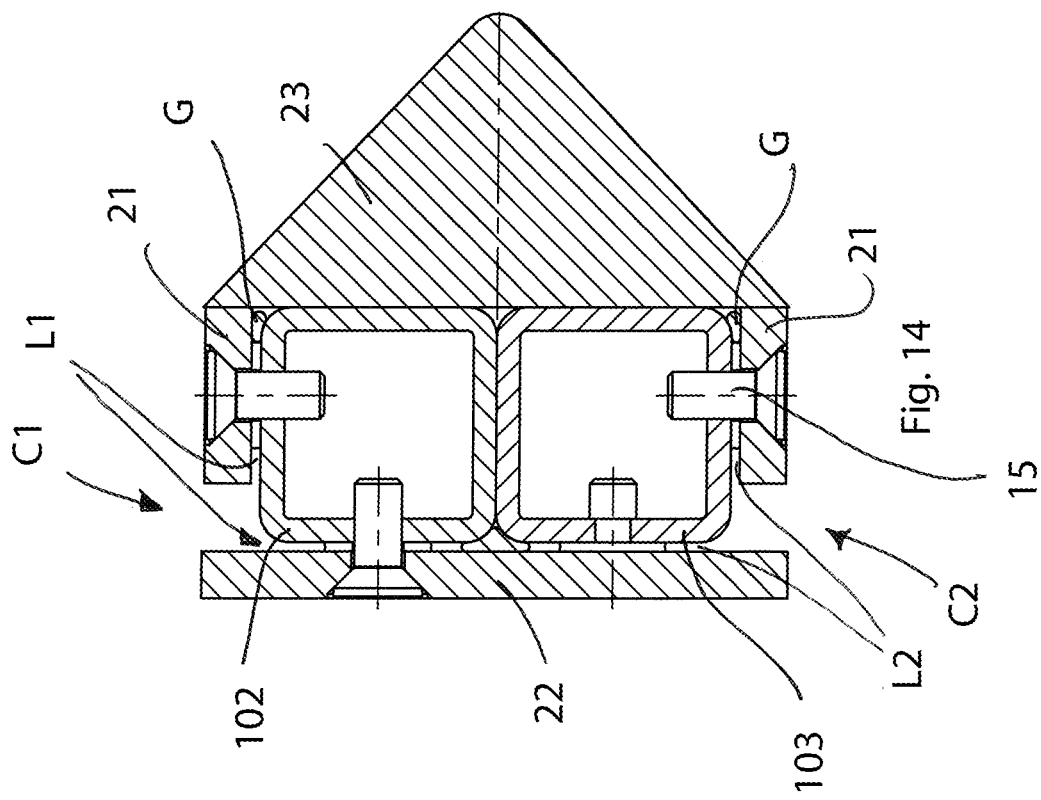
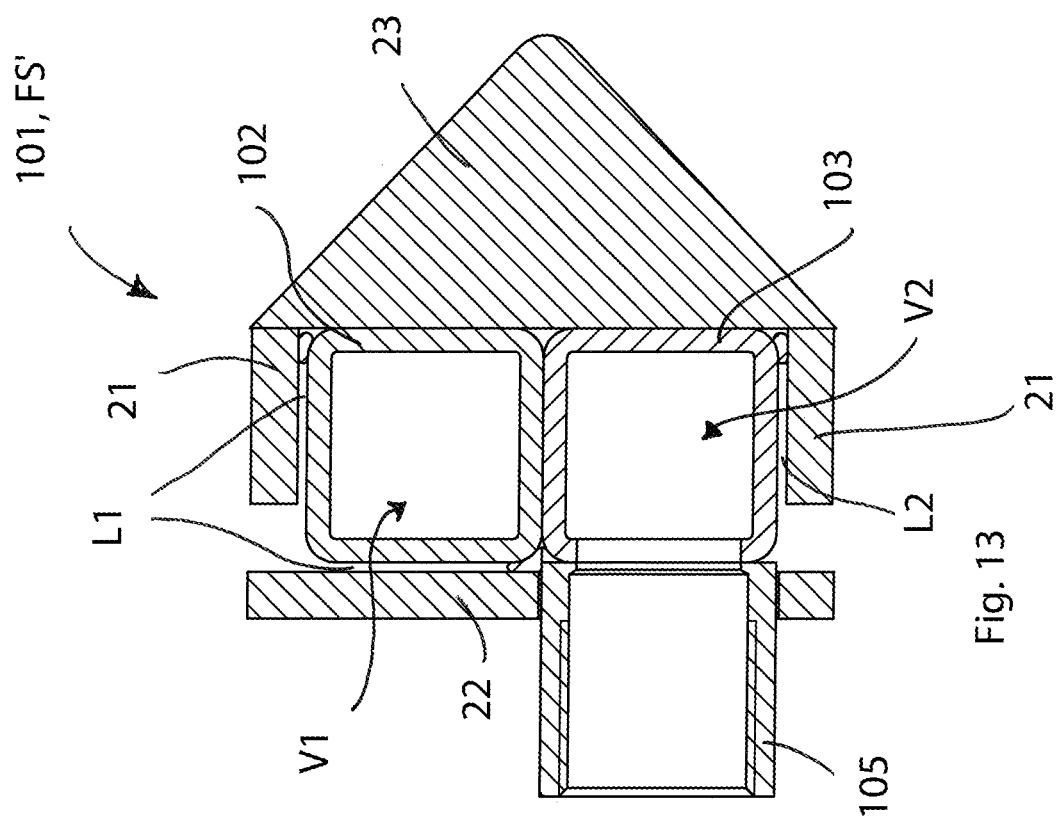

FRAME DEVICE AND METHOD FOR THERMOFORMING OBJECTS

BACKGROUND OF THE INVENTION

The invention relates to a frame device (and relative method) for retaining and positioning sheet materials, with possible interposed reinforcing material intended to be thermoformed to obtain objects such as panels or pieces made of plastics or reinforced composite material.

PRIOR ART

In the thermoforming technical field, for the production of components intended for example for, and not only, the motor industry, plates or sheets of thermoformable material—once having been heated beforehand to a suitable temperature necessary for achieving a suitable softened state—are applied inside suitable thermoforming moulds in which they are shaped by the action of a punch cooperating with a die.

In some cases, in order to produce panels of polyurethane foam (for example soundproofing and/or thermally insulating panels for vehicles or other purposes) or in the production of coating panels, the application of coating sheets is often required during the moulding operation, these sheets having an impermeabilization function that is suitable for preventing the interposed layer of polymerized foam being able to absorb humidity or water with the risk of deteriorating over time.

In the processes for thermoforming objects made of composite material, a reinforcing material is placed between two sheets of plastics, and everything is subjected to the shaping action performed by the die and mould.

In all the above cases, it is necessary to handle with care the various materials, taking care to position them correctly and avoiding dirtying, with possible resin, the surfaces of the mould.

With reference to thermoforming of objects made of reinforced composite material, systems are known for retaining and positioning sheet materials that use three different and distinct gripping frames: a first frame for grasping or gripping a lower sheet material, a second frame for grasping an intermediate reinforcing material, and a third frame for grasping an upper sheet material.

Once each material has been secured to the respective frame at the perimeter of the material, reciprocal coupling is proceeded with, by clamping elements of the three distinct frames so as to form a single set of frames intended to be positioned on a thermoforming half mould.

A drawback of the system disclosed above stems from the poor versatility of use thereof and above all from the inconvenience and difficulty of management, due to the need to have to manipulate three different frames.

In other words, the system disclosed above does not lend itself to use in plants with total automation, i.e. without the intervention of one or more operators, or the automation of this known system is so complex and onerous as to be hardly sustainable.

Another drawback is given by the complexity of managing in the warehouse distinct and separate frames that define the aforesaid known system, with costs and difficulties associated with the requested storage spaces.

From WO2007/128397 there are known a method and an appliance for gripping, by a vacuum action, sheets of plastics.

WO99/64221 discloses an apparatus and a method for twin-sheet thermoforming.

In the light of the above, there is considerable room for improvement of the current frame systems for the containment and positioning of the materials to be thermoformed.

OBJECTS OF THE INVENTION

An object of the present invention is to provide an apparatus and a method that is able to overcome the aforesaid limits of the prior art.

Another object of the invention is to improve the methods and/or frame devices for retaining and positioning materials to be thermoformed in the mould.

Still another object of the invention is to provide a technical solution that is easy to manage and enables the handling and positioning steps of the materials to be thermoformed to be completely automated, in particular for obtaining objects made of polymeric material with coatings and/or of reinforced composite material.

SHORT DESCRIPTION OF THE INVENTION

According to the invention, a frame device and a method are provided for retaining and positioning sheet materials to be thermoformed to obtain objects made of plastics.

Owing to the invention, it is possible to handle in a simplified manner the various materials intended for thermoforming, making possible complete automation of the operations of transferring and applying materials to the thermoforming mould, in particular owing to the single grasping frame-structure that is able to perform the gripping action simultaneously (and autonomously and independently) on two distinct sheet materials and is also able to create the vacuum, if necessary, in the zone interposed between the two aforesaid sheet materials intended for receiving one or more possible reinforcing materials of pre-impregnated type, or of dry type intended to be impregnated with a desired resin.

Owing to the particular structural and geometric conformation of the frame device, it is possible to use resins having very low viscosity.

The particular structural conformation of the frame device according to the invention further enables exploitation of the materials to be thermoformed to be optimized, by minimizing waste from the materials.

SHORT DESCRIPTION OF THE DRAWINGS

Further features and advantages of the invention will be clearer from the following description with the help of the attached drawings that show some embodiments by way of non-limiting example, in which:

FIGS. 5 and 6 are sections taken respectively along the planes V-V and VI-VI in FIG. 2;

FIGS. 11 and 12 are sections taken respectively along the planes XI-XI and XII-XII in FIG. 10;

FIGS. 13 and 14 are sections taken respectively along the planes XIII-XIII and XIV-XIV in FIG. 10.

DETAILED DESCRIPTION OF THE INVENTION

Figure 1:
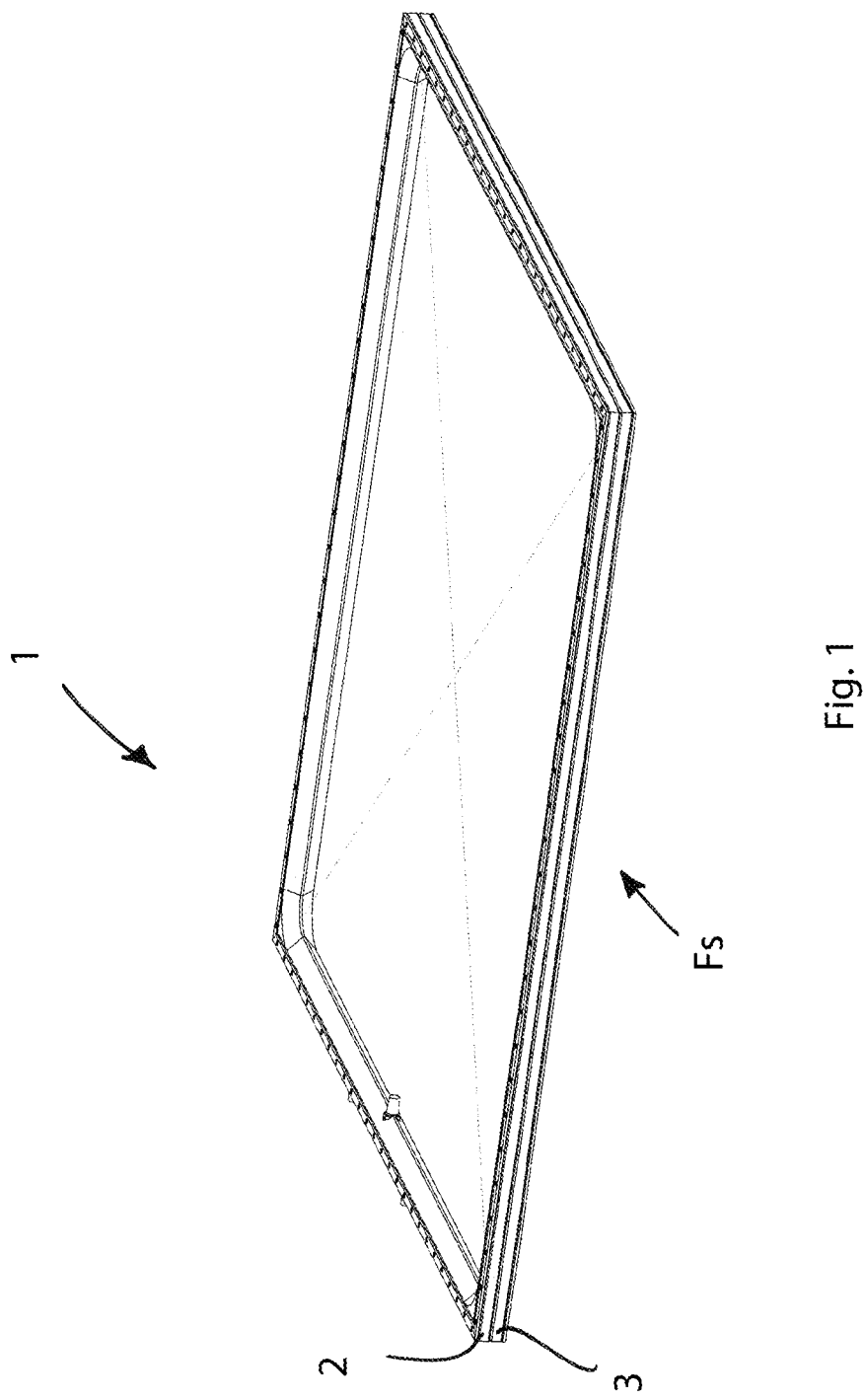
FIG. 1 is a perspective view of a first embodiment of a frame device according to the invention.

With reference to attached FIGS. 1 to 10, a first embodiment of a frame device 1 for retaining and positioning sheet materials (S1, S2) to be thermoformed to obtain objects made of plastics material is shown.

The device 1 comprises a first tubular element 2 defining internally a first vacuum chamber V1 for grasping by aspiration a first sheet material S1, and a second tubular element 3 defining internally a second vacuum chamber V2, which are separate and independent of the aforesaid first vacuum chamber V1 and configured for grasping by aspiration a second sheet material S2.

The sheet materials S1 and/or S2 can constitute the coating layers with an aesthetic/impermeable function or also simply the structural walls for the object to be obtained by thermoforming.

The first 2 and second 3 tubular elements, in particular but not in a limiting manner, can have a cross section of square shape.

It is nevertheless possible to provide other geometric configurations for the transverse profile of the first 2 and second 3 tubular elements, or, in general, of the grasping frame-structure FS.

The first tubular element 2 and the second tubular element 3 are fixed together permanently so as to define a grasping frame-structure FS configured as a single piece.

In the grasping frame-structure FS, a third vacuum chamber V3 is defined that is separate and independent of the aforesaid first V1 and second V2 vacuum chambers.

The third vacuum chamber V3 is configured for making possible the removal of air from the zone which is defined and is interposed between the first S1 and the second S2 sheet material.

In fact, if it is desired to obtain by thermoforming an object made of reinforced composite material, between the first S1 and the second S2 sheet materials a reinforcing material R is interposed, such as for example a layer of carbon fibre, or another reinforcing material R. In this case, the third vacuum chamber V3 is driven to remove the air from the volume bounded between the first S1 and second S2 sheet materials so as to force the latter to adhere effectively to the respective opposite faces of the interposed reinforcing material R.

In the following there is described in greater detail the aspirating system for grasping sheet materials with which the grasping frame-structure FS, in particular each tubular element 2, 3, are provided.

The frame device 1 is provided with a first gripping slot C1 and with a second gripping slot C2 that extend peripherally on respective mutually opposite faces. The first gripping slot C1 and the second gripping slot C2 are in fluid communication respectively with the first vacuum chamber V1 and with the second vacuum chamber V2.

The first gripping slot C1 and the second gripping slot C2 are configured for receiving internally, by an aspirating action, corresponding perimeter portions of the first sheet material S1 and of the second sheet material S2 respectively.

The first gripping slot C1 and the second gripping slot C2 are geometrically shaped so as to constrict the perimeter portions of the sheet materials 2, 3, attracted by the aspirating effect, to fold and penetrate the interior thereof. By so doing, the sheet materials S1, S2 are secured perimeterally owing to a combined action of aspiration and shape coupling to which also the friction action contributes that is generated in the mutual contact between the sheet materials S1, S2, and the surfaces of the grasping frame-structure FS.

The first gripping slot C1 and the second gripping slot C2 are placed in fluid communication respectively with the first vacuum chamber V1 and with the second vacuum chamber V2 by suitable slits L1, L2 and suitable holes 20 along the respective first 2 and second 3 tubular elements.

More precisely, the frame device 1 comprises bars 21, 22 of flat shape connected to, and spaced apart from, the first 2 and the second element 3 so as to define suitable slits L1, L2 having a desired thickness.

Sealing elements G are provided, for example beads of sealing material, which extend along some strips at the interface between each bar 21, 22 and the respective tubular element (3; 103) to generate a seal and generate the "vacuum" effect in the gripping slots C1, C2.

The aforesaid bars 21, 22 of flat shape are connected by screw elements 15 or other suitable fixing elements, or welded or glued to the respective first 2 and second tubular element 3.

It is possible to provide suitable spacer elements arranged for adjusting a certain distance or reciprocal distance between the bars 21, 22 and the first 2 and second 3 tubular elements so as to set and impose the suitable geometric configuration to the aforesaid slits and gripping slots C1, C2, according to the features and type of sheet materials to be grasped and processed.

The frame device 1 further comprises an abutting element 23 which extends along the inner perimeter of the grasping frame-structure FS, and is configured for restingly receiving portions of the first S1 and of the second S2 sheet materials and for controlling the tensioning stress ("stretching") and ensuring correct positioning of the first S1 and second S2 sheet materials.

In particular, the abutting element comprises an abutting element 23, which extends along the inner perimeter of the grasping frame-structure FS and is shaped with a substantially triangular section for restingly receiving some portions of the first S1 and second S2 sheet materials, acting to reduce the stretching stress thereof.

In other words, in the absence of this abutting element 23, the portions of sheet near the grasping frame-structure FS would be subjected, through the effect of the action of aspiration in the interposed layer, to significant stress intended to make the portions of sheet adhere (with folding almost at right angles) to the vertical walls of the grasping frame-structure FS. Owing to the presence of this abutting element 23, this phenomenon of excessive localized stress is avoided.

In the aforesaid abutting element 23 at least one aspiration opening is obtained, in communication with the third vacuum chamber V3.

In particular, in the abutting element 23 aspiration holes 24 are obtained, suitably distributed equidistantly along the extent thereof, which are in communication with the third vacuum chamber V3. Such holes then transmit the "aspirating" action to the volume that is defined between the two upper and lower sheet materials S1 and S2.

The frame device 1 further comprises one or more first connections 4 for the fluid connection of the first vacuum chamber V1 to an aspiration pneumatic circuit, one or more second connections 5 for the fluid connection of the second vacuum chamber V2 to the aforesaid aspiration pneumatic circuit, and one or more third connections 6 for the fluid connection of the third vacuum chamber V3 to the aforesaid aspiration pneumatic circuit.

In particular, in the specific non-limiting embodiments here disclosed and shown in the attached figures, two first connections 4, two second connections 5 and a third connection 6 are provided.

Figure 2:
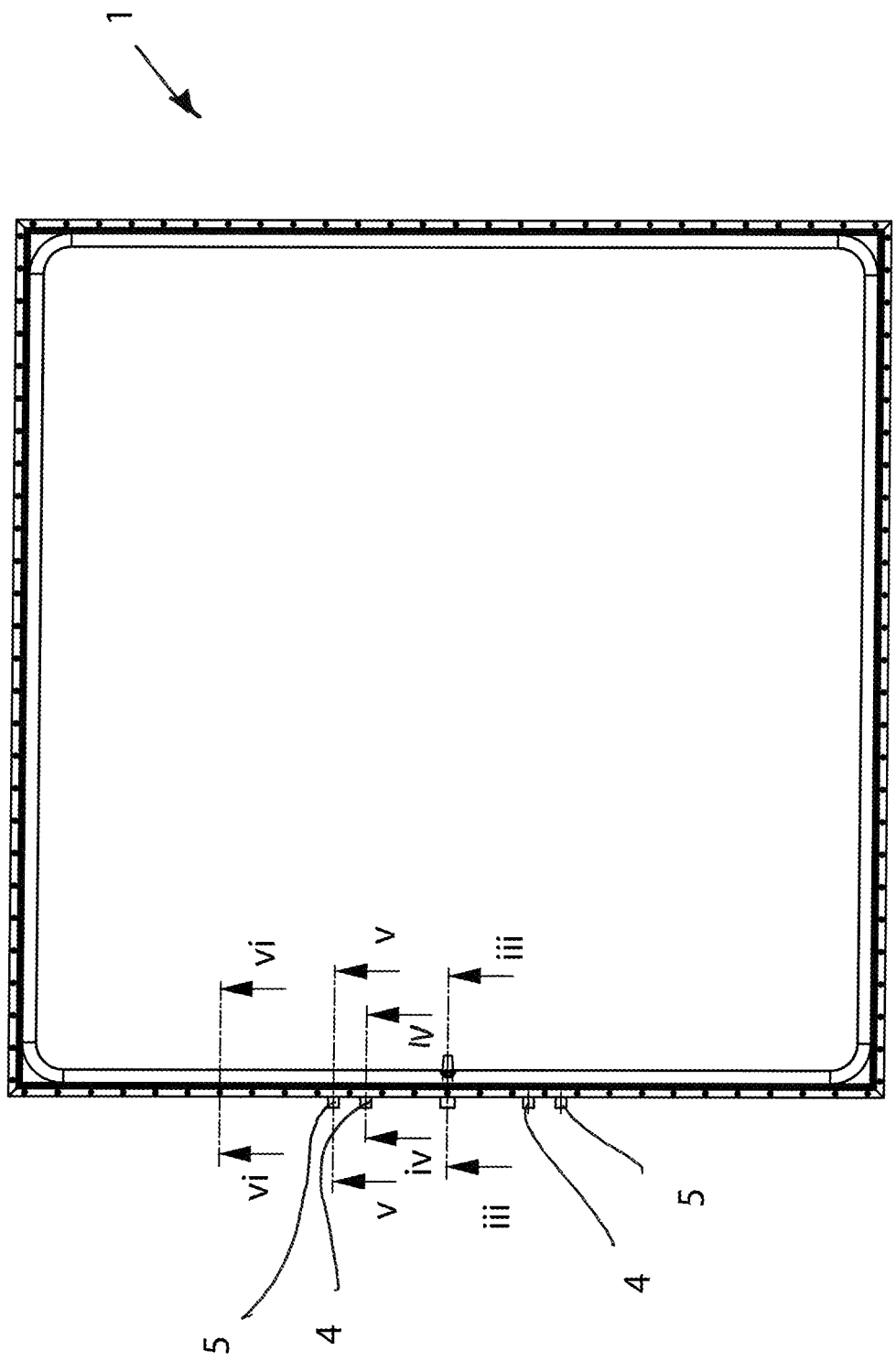
FIG. 2 is a plan view of the device in FIG. 1.
Figure 2A:
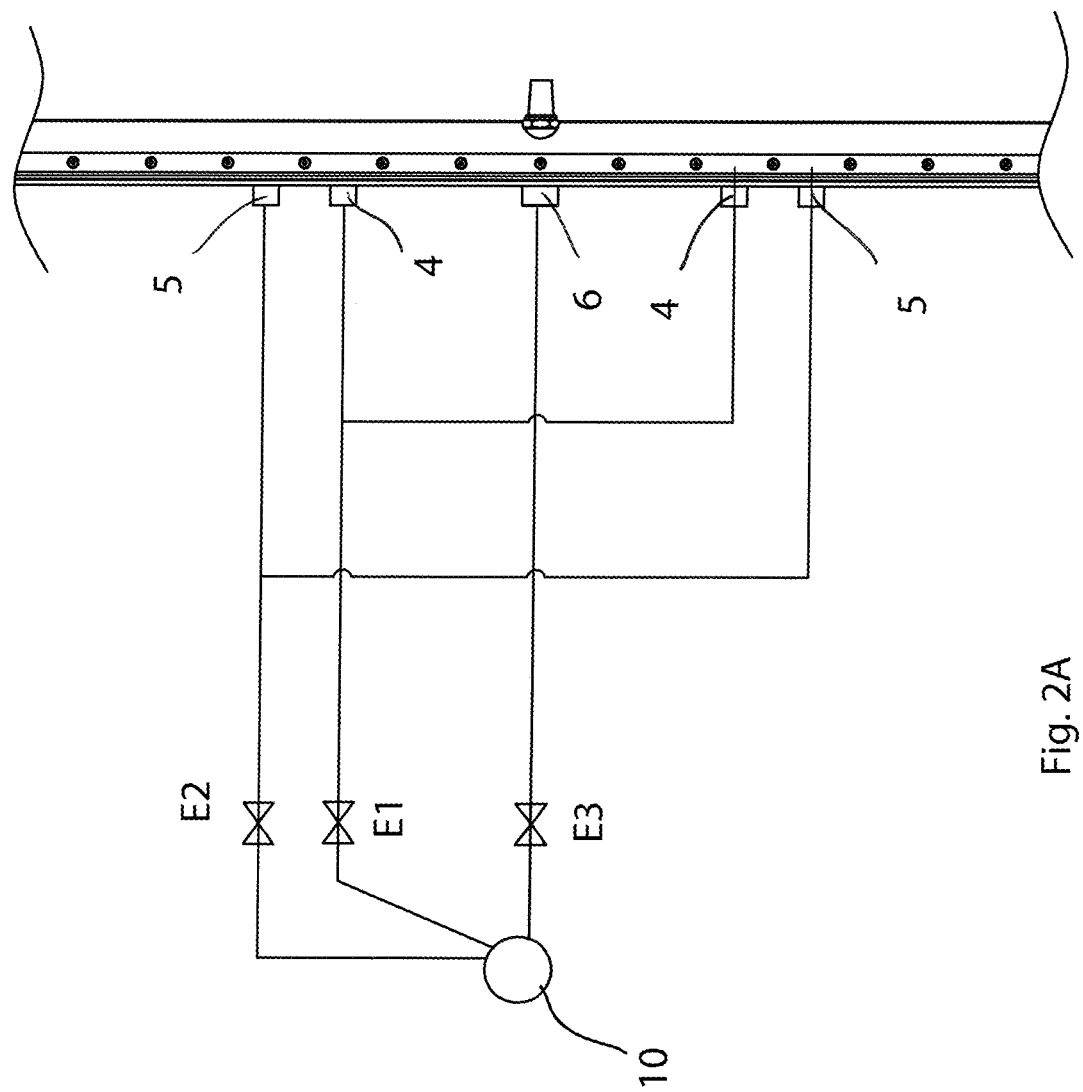
FIG. 2A shows an enlarged detail of a portion of the device in FIG. 2 to which a (schematized) pneumatic circuit for generating the vacuum is connected.
Figure 4:
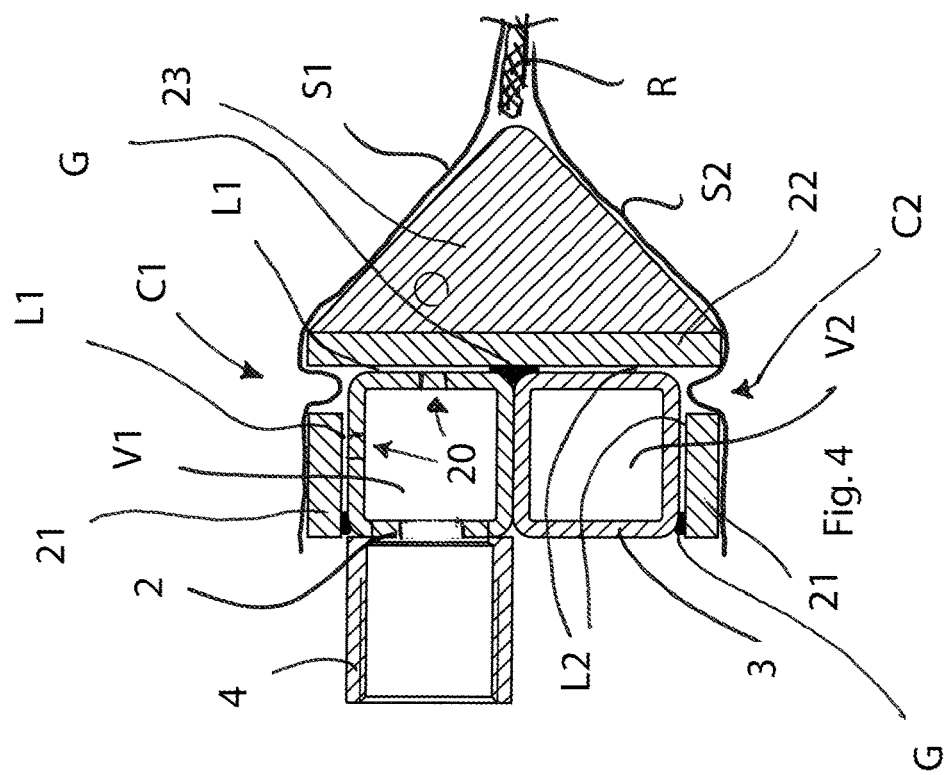
FIGS. 3 and 4 are sections taken respectively along the planes III-III and IV-IV in FIG. 2.
Figure 3:
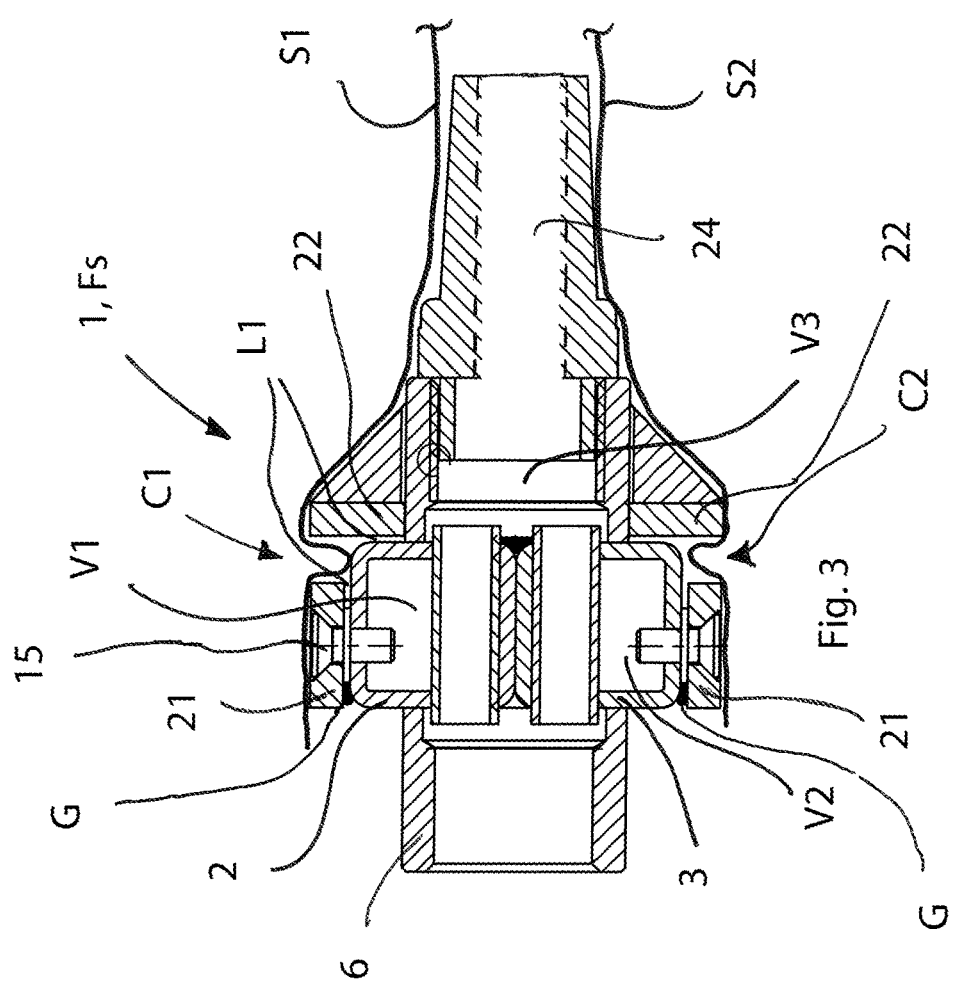
Figure 7:
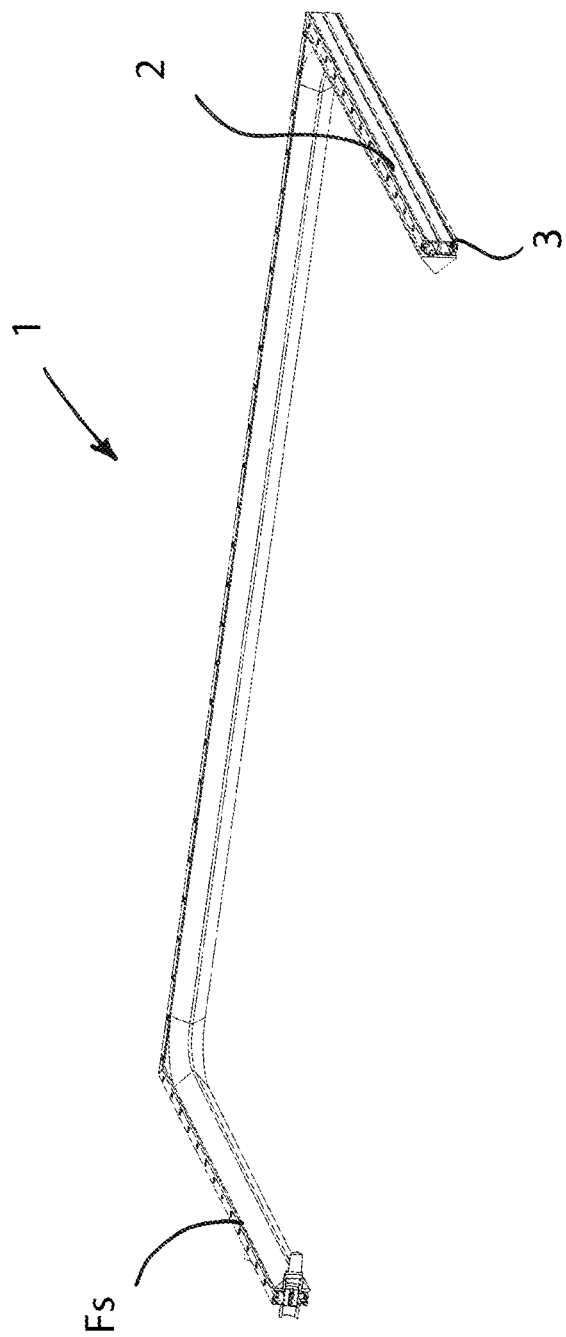
FIG. 7 is a cutaway perspective view of the frame device according to a first embodiment.
Figure 8:
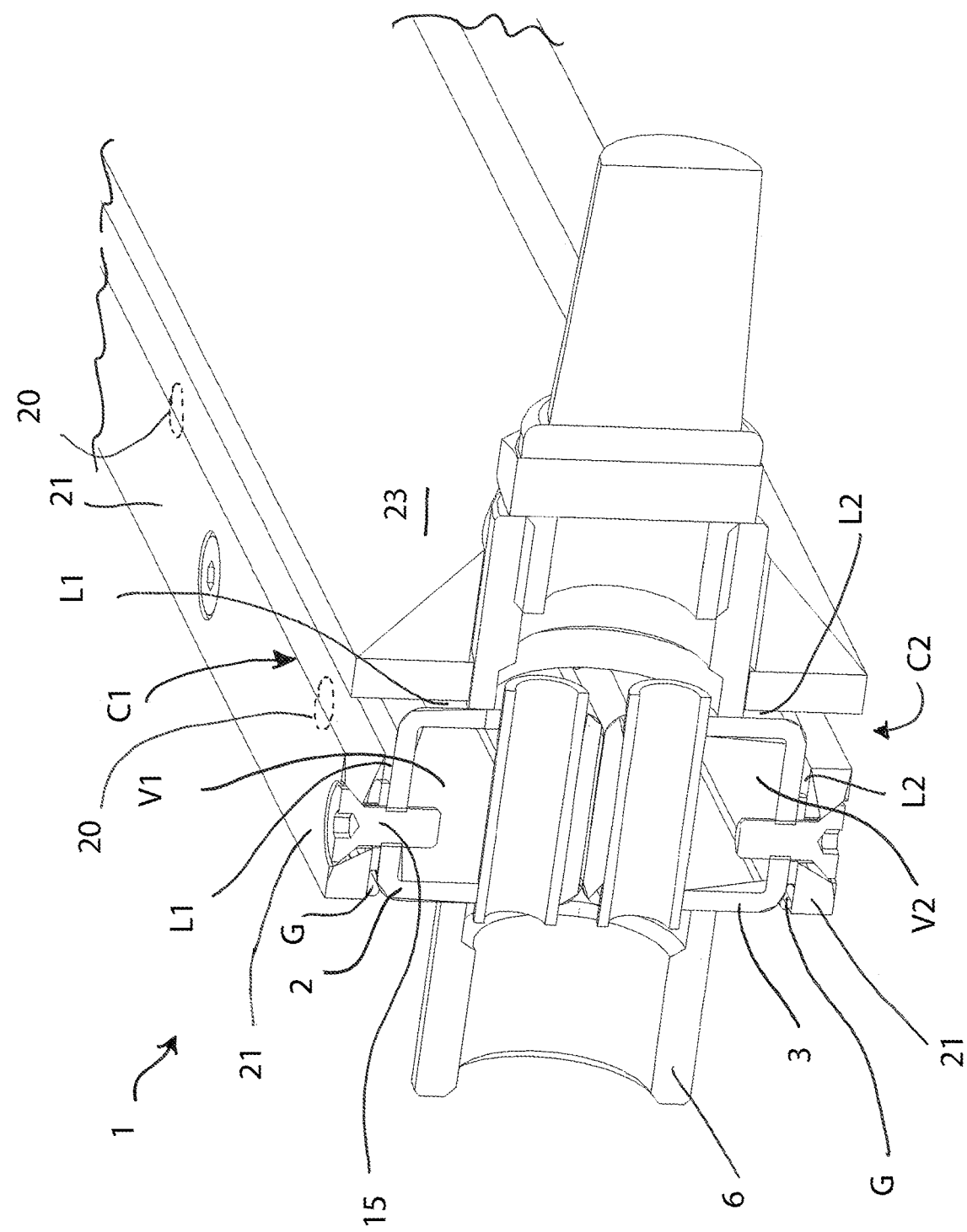
FIGS. 8 and 9 are enlarged views respectively of the left end and the right end of the portion of device shown in FIG. 7.
Figure 9:
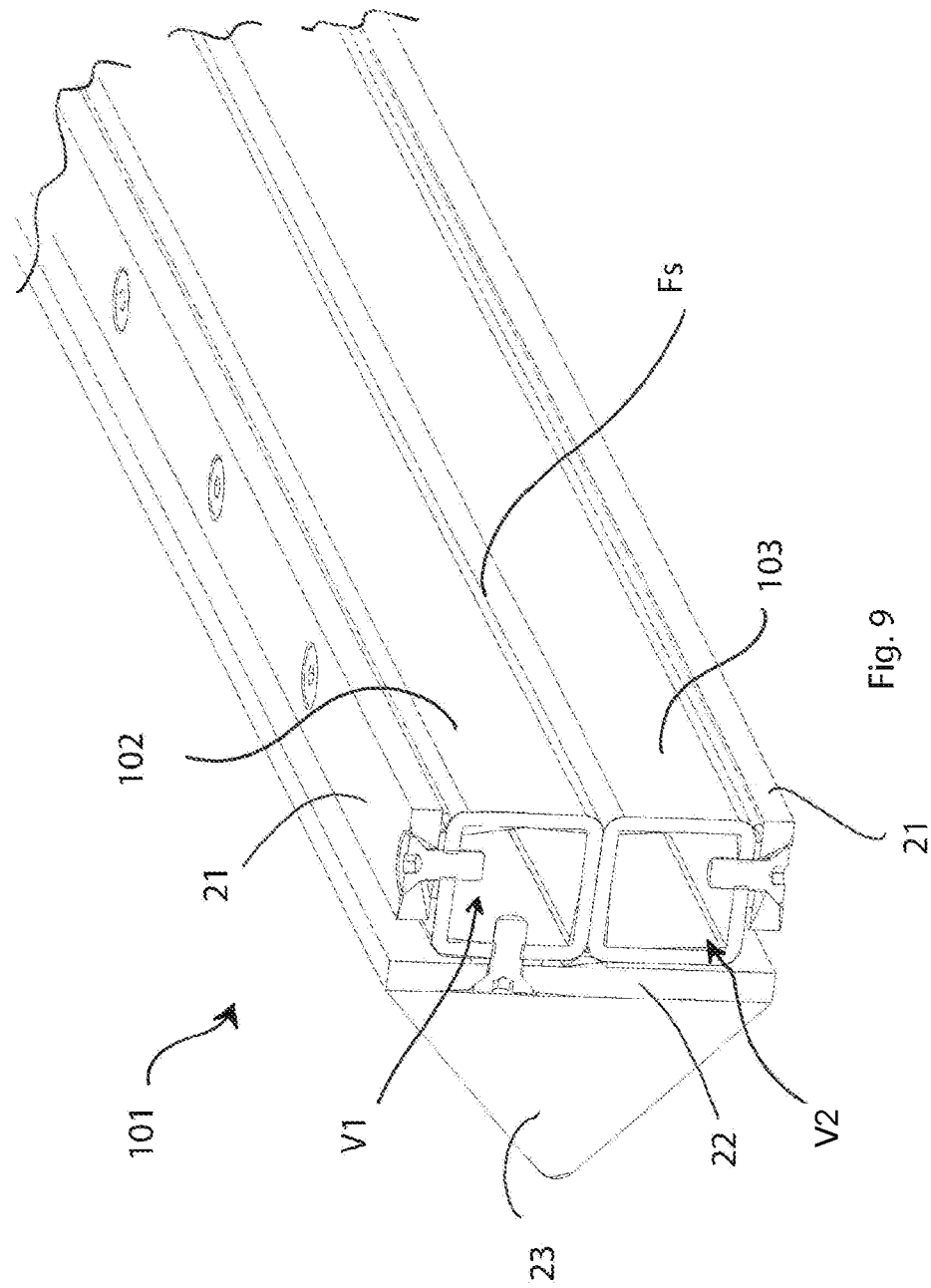
Figure 10:
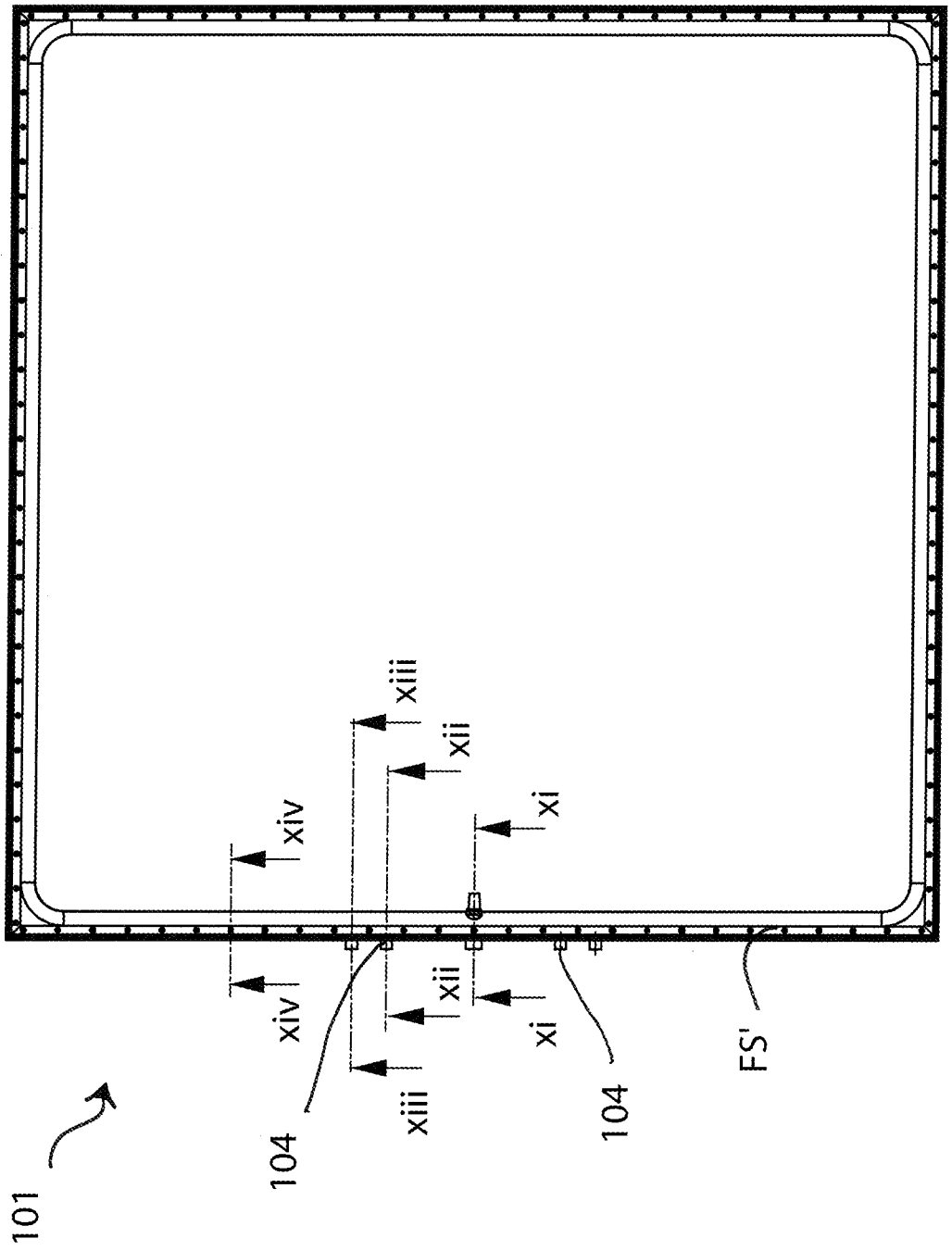
FIG. 10 is a plan view of a version of the frame device according to the invention.

The aforesaid connections 4, 5, 6, are fixed integrally to the grasping frame-structure FS; FS' and are arranged for being connected to a vacuum source 10 (schematized in FIG. 2A) by respective aspiration pneumatic circuit branches and associated solenoid valves E1, E2, E3.

As already anticipated above, said first vacuum chamber V1, second vacuum chamber V2 and third vacuum chamber V3 are reciprocally separate, and are operable autonomously and independently of one another.

In the following, there is concisely described the functioning of the frame device 1 that has just been disclosed and then a relative method for handling sheet materials S1, S2 to be applied inside a thermoforming mould to obtain an object.

First, the lower sheet material S2 is grasped by applying to the latter the grasping frame-structure FS. Precisely, the sheet material S2 is brought into contact with the second tubular element 3, making a perimeter portion of the sheet adhere to the lower gripping slot C2, by the aspirating action exerted by the second vacuum chamber V2.

If the use of a (possible) intermediate reinforcing material is required, the aforesaid material R, for example carbon fibre or another material, is layed, and a dosed quantity of resin or another desired substance is poured.

Alternatively, it is possible to lay on the lower sheet material S2 a layer of pre-impregnated reinforcing material that does not need a dosed quantity of resin to be poured but activates autonomously thermally during thermoforming.

According to another possible operating mode made possible by the frame device 1 according to the invention, owing to the particular structural and functional conformation thereof, objects are obtainable without the use of the reinforcing material. In other words, it is possible to pour only a dosed quantity of resin between the lower sheet material S2 and the upper sheet material S1, in the absence of the reinforcing material R. In this case, the resin is well enclosed and sealed between the two sheet materials S1, S2 without any risk that it may exit and soil the thermoforming plant. Naturally, for this operating mode, it will be necessary to use suitable resins, i.e. having set chemical and physical features, and the procedure will continue by driving appropriately (or not driving at all, depending on the cases), the third vacuum chamber V3.

Returning on the other hand to the cases in which the reinforcing material is envisaged, subsequently to the laying step of the reinforcing material, the upper sheet material S1 is applied thereupon. The second vacuum chamber V2 is then driven to make the perimeter zone of the upper sheet material S1 adhere by acting owing to the upper gripping slot C1.

In order to remove the air between the two sheets or plates or films S1, S2, the pneumatic circuit is driven to generate the vacuum in the corresponding third vacuum chamber V3.

In this manner, perfect adhesion of the two sheets or plates S1, S2 to the interposed reinforcing layer R is achieved, obtaining a well-sealed multilayered unit that is easy to handle and to transfer owing to the monolithic grasping frame-structure FS.

At this point, the multilayered unit can be introduced into the mould: it is made to adhere by shaping it to the inner surface of the aforesaid mould, after that the thermoforming process can be started up.

It is possible to provide a suitable central management and control unit configured for managing, in a completely automated manner, the frame device 1 according to the invention.

In particular, the management and control unit, amongst the various functions, can have that of driving selectively the three solenoid valves E1, E2, E3, and controlling the vacuum source 10 during the sequential steps of the operation of gripping and positioning the sheet materials S1, S2 and possible reinforcing material R.

With reference to FIGS. 10 to 14, a second embodiment of the frame device 101 is shown.

The parts of this second embodiment that are similar or identical to the previously disclosed first embodiment will be indicated by the same reference numbers or by corresponding reference numbers increased by 100.

The second version of frame device 101 differs from the first embodiment, for example by the fact that it provides a different reciprocal position of the flat bars 21 relative to the gripping slots C1, C2.

In the second embodiment, in fact, unlike the first embodiment, the bars 21 of flat shape are nearer the inner abutting element 23 than the gripping slots C1, C2. This structural configuration can be more effective for certain types of sheet materials and/or for other application needs.

Otherwise, the structural/functional features of the second embodiment of the device 101 are similar to those of the first embodiment disclosed previously.

As can be seen from what has been disclosed, the frame device 1, 101 and the corresponding method according to the invention, enable the objects declared above to be achieved.

In particular, the frame device 1, 101, defined by a single piece such as the frame-structure FS, FS', proves to be a technical solution that is easy to manage that lends itself to being used in a completely automated manner.

As could be ascertained from the description, the device 1, 101 disclosed above thus performs alone (without the need for other members) both the function of perimeter sealing of the two sheet materials S1, S2 (owing to the first V1 and second V2 vacuum chambers), and the function of imposing mutual adhesion thereto (owing to the third vacuum chamber V3), with clear advantages from the point of view of both structural and functional simplification of the entire process. In particular, the "desired shape" of the two sheet materials with the possible reinforcing material interposed is imposed by the third vacuum chamber V3 (which is part of the device itself), through the effect of the aspiration of air through the aspiration opening/s 24 provided in the abutting portion 23.

It is possible to configure and size the device 1, 101 in the desired manner according to the dimensions/geometry/mechanical features of the materials to be handled, with possible variations on and/or additions to what has been disclosed and illustrated in the attached drawings.

Owing to the particular structural and geometric conformation of the frame device 1, 101, it is possible to use resins with very low viscosity and there is no risk of a leak of resin.

What has been said and shown in the attached drawings has been provided merely by way of illustrative example of the innovative features of the system 1 and other modifications can be made to the device 1, 101, or to parts thereof, without thereby falling outside the scope of the claims.

In practice, the materials, inasmuch as they are compatible with the specific use and with the respective single elements for which they are intended, can be opportunely chosen according to the specific requirements and according to the available prior art.

The invention claimed is:

1. Frame device for retaining and positioning sheet materials to be thermoformed to obtain objects made of plastics material, said device comprising:
    a first tubular element defining internally a first vacuum chamber for grasping by aspiration a first sheet material,
    a second tubular element defining internally a second vacuum chamber, separate from and independent of said first vacuum chamber and configured for grasping by aspiration a second sheet material,
    wherein said first tubular element and said second tubular element are fixed together permanently so as to define a grasping frame-structure configured as a single piece to perform simultaneous and independent gripping actions on the first and second sheet materials, respectively;
    a first gripping slot and second gripping slot that extend peripherally on respective mutually opposite faces and are suitable for receiving internally, by an aspirating action, perimeter portions respectively of the first sheet material and of the second sheet material, said first gripping slot and second gripping slot being in fluid communication respectively with said first vacuum chamber and said second vacuum chamber, said first and second gripping slots being configured for folding and receiving inside the perimeter portions of the first and second sheet materials, respectively so that the first and second sheet materials are peripherally constrained owing to a combined action of aspiration, shape coupling, and friction that is generated in a mutual contact between the first and second sheet materials and surfaces of said grasping frame-structure;
    a third vacuum chamber being defined in said grasping frame-structure, separate and independent of said first and second vacuum chambers, and configured for removing air from a zone that is interposed between the first and second sheet materials, and
    an abutting element, which extends along the inner perimeter of said grasping frame-structure, configured for receiving portions of the first and second sheet materials and configured for controlling a stretching stress and a positioning of the first and second sheet materials, said abutting element containing at least one aspiration opening in communication with said third vacuum chamber.

2. Frame device according to claim 1, wherein said third vacuum chamber is drivable to remove air from a layer which is interposed between the first and second sheet materials and which is suitable for being occupied by a reinforcing material, to obtain an object made of a reinforced composite material.

3. Frame device according to claim 1, wherein said first gripping slot and said second gripping slot are in fluid communication with said first vacuum chamber and with said second vacuum chamber respectively by suitable slits and by holes obtained along the respective first and second tubular elements.

4. Frame device according to claim 3, comprising bars of flat shape connected to, and spaced apart from, said first and second tubular elements so as to define slits having a desired thickness.

5. Frame device according to claim 4, wherein said bars of flat shape are connected by screw elements, or welded, to the respective first and second elements, and wherein sealing elements are provided that extend along some interface-strips at an interface between the bars and the respective first and second tubular elements to generate a seal.

6. Frame device according to claim 1, wherein said abutting element is shaped with a substantially triangular section.

7. Frame device according to claim 1, wherein said grasping frame-structure comprises:
    one or more first connections for connecting said first vacuum chamber to an aspiration pneumatic circuit,
    one or more second connections for connecting said second vacuum chamber to said aspiration pneumatic circuit, and
    one or more third connections for connecting said third vacuum chamber to said aspiration pneumatic circuit.

8. Frame device according to claim 7, comprising a vacuum source connected by respective pneumatic aspiration circuit branches and associated solenoid valves to said one or more first connections, one or more second connections and one or more third connections, said first vacuum chamber, second vacuum chamber and third vacuum chamber being operable autonomously and independently of one another.

* * * * *